(12) United States Patent
Huang et al.

(10) Patent No.: US 11,715,979 B2
(45) Date of Patent: Aug. 1, 2023

(54) MULTI-ELEMENT DRIVER TOPOLOGY FOR ELEMENT SELECTION

(71) Applicant: Renesas Electronics America Inc., Milpitas, CA (US)

(72) Inventors: Jiangjian Huang, San Jose, CA (US); Hulong Zeng, San Jose, CA (US)

(73) Assignee: Renesas Electronics America, Inc., Milpitas, CA (US)

(*) Notice: Subject to any disclaimer, the term of this patent is extended or adjusted under 35 U.S.C. 154(b) by 0 days.

(21) Appl. No.: 17/383,870

(22) Filed: Jul. 23, 2021

(65) Prior Publication Data
US 2023/0027127 A1 Jan. 26, 2023

(51) Int. Cl.
| H02J 50/00 | (2016.01) |
| H02J 50/12 | (2016.01) |
| H04B 5/00 | (2006.01) |
| H02M 7/521 | (2006.01) |

(52) U.S. Cl.
CPC ........... *H02J 50/12* (2016.02); *H02M 7/521* (2013.01); *H04B 5/0037* (2013.01); *H04B 5/0081* (2013.01)

(58) Field of Classification Search
None
See application file for complete search history.

(56) References Cited

U.S. PATENT DOCUMENTS

| 10,256,666 | B2* | 4/2019 | Jung | H02J 7/04 |
| 2010/0259217 | A1* | 10/2010 | Baarman | H02J 7/0013 320/108 |
| 2011/0285210 | A1* | 11/2011 | Lemmens | H01F 38/14 307/104 |
| 2012/0068550 | A1* | 3/2012 | Boer | H02J 50/90 307/104 |
| 2017/0179765 | A1* | 6/2017 | Habraken | H04B 5/0037 |
| 2018/0337549 | A1* | 11/2018 | Chen | H02J 50/12 |
| 2019/0104569 | A1* | 4/2019 | Moon | H05B 6/062 |
| 2020/0204013 | A1* | 6/2020 | Chen | H02J 50/10 |

* cited by examiner

*Primary Examiner* — Adi Amrany
(74) *Attorney, Agent, or Firm* — Scully, Scott, Murphy & Presser, P.C.

(57) ABSTRACT

Apparatuses including multiple selectable circuit elements are described. In an example, an apparatus may include a power supply configured to output a voltage. The apparatus may further include a controller connected to the power supply and a transmission unit connected to the controller. The transmission unit may be configured to output power. The transmission unit may include comprising an inverter connected to the power supply. The inverter may include a high-side switching element. The transmission unit may further include a circuit element a circuit connected to the power supply. The circuit may be configured to select the circuit element. The circuit may include a switch connected between the inverter and the circuit element. The switch and the high-side switching element may be configured to be driven by the voltage outputted by power supply. The controller may be configured to control the power being outputted by the transmission unit.

20 Claims, 5 Drawing Sheets

MULTI-ELEMENT DRIVER TOPOLOGY FOR ELEMENT SELECTION

BACKGROUND

The present disclosure relates in general to apparatuses and systems for wireless power transmission. In particular, the present disclosure relates to transmitters including multiple transmission coils selectable by load switch circuits that share common power supply with high-side switching elements of an inverter.

A wireless power system can include a transmitter having a transmission (TX) coil and a receiver having a receiver (RX) coil. The transmitter and the receiver can be brought close to one another in order for the TX coil and the RX coil to form a transformer that can facilitate inductive transmission of alternating current (AC) power. In an example, the transmitter can be a single coil wireless transmitter including one TX coil. The single coil wireless transmitter can include a H-bridge inverter (or a H-bridge circuit) that generate high frequency signals to excite the TX coil. For applications that utilizes multiple TX coils, a multi-coil wireless transmitter having multiple TX coils can be used for power transmission.

SUMMARY

In some examples, an apparatus including multiple selectable circuit elements is generally described. The apparatus may include a circuit configured to select a circuit element. The circuit may include a switch connected between an inverter and the circuit element. The switch and a high-side switching element of the inverter may be configured to be driven by a common voltage source.

In some examples, an apparatus including multiple selectable circuit elements is generally described. The apparatus may include an inverter including a high-side switching element. The apparatus may further include a circuit element. The apparatus may further include a circuit configured to select the circuit element. The circuit may include a switch connected between the inverter and the circuit element. The switch and the high-side switching element may be configured to be driven by a common voltage source.

In some examples, an apparatus that may implement power transfer is generally described. The apparatus may include a power supply configured to output a voltage. The apparatus may further include a controller connected to the power supply. The apparatus may further include a transmission unit connected to the controller. The transmission unit may be configured to output power. The transmission unit may include an inverter connected to the power supply. The inverter may include a high-side switching element. The transmission unit may further include a circuit element and a circuit connected to the power supply. The circuit may be configured to select the circuit element. The circuit may include a switch connected between the inverter and the circuit element. The switch and the high-side switching element may be configured to be driven by the voltage outputted by power supply. The controller may be configured to control the power being outputted by the transmission unit.

Further features as well as the structure and operation of various embodiments are described in detail below with reference to the accompanying drawings. In the drawings, like reference numbers indicate identical or functionally similar elements.

DETAILED DESCRIPTION

Topologies for multi-coil wireless power transmitters can be an expansion of a single coil wireless transmitter topology. One example can be adding one H-bridge inverter for each additional TX coil. Another implementation can be inserting one load switch and one load switch driver for each additional TX coil while having the multiple TX coils share the same H-bridge inverter. However, both of these implementations require insertion of additional circuit components that may occupy relatively more circuit board space. The circuits and apparatuses disclosed herein can provide a multi-coil wireless power transmitter topology that utilizes relatively less circuit components, thus occupy relatively less circuit board space, when compared to other topologies. The circuits and apparatuses disclosed herein can also be applied to other multi-element devices, such as a single coil wireless power transmitter having multiple capacitors connected to one transmission coil.

Figure 1:
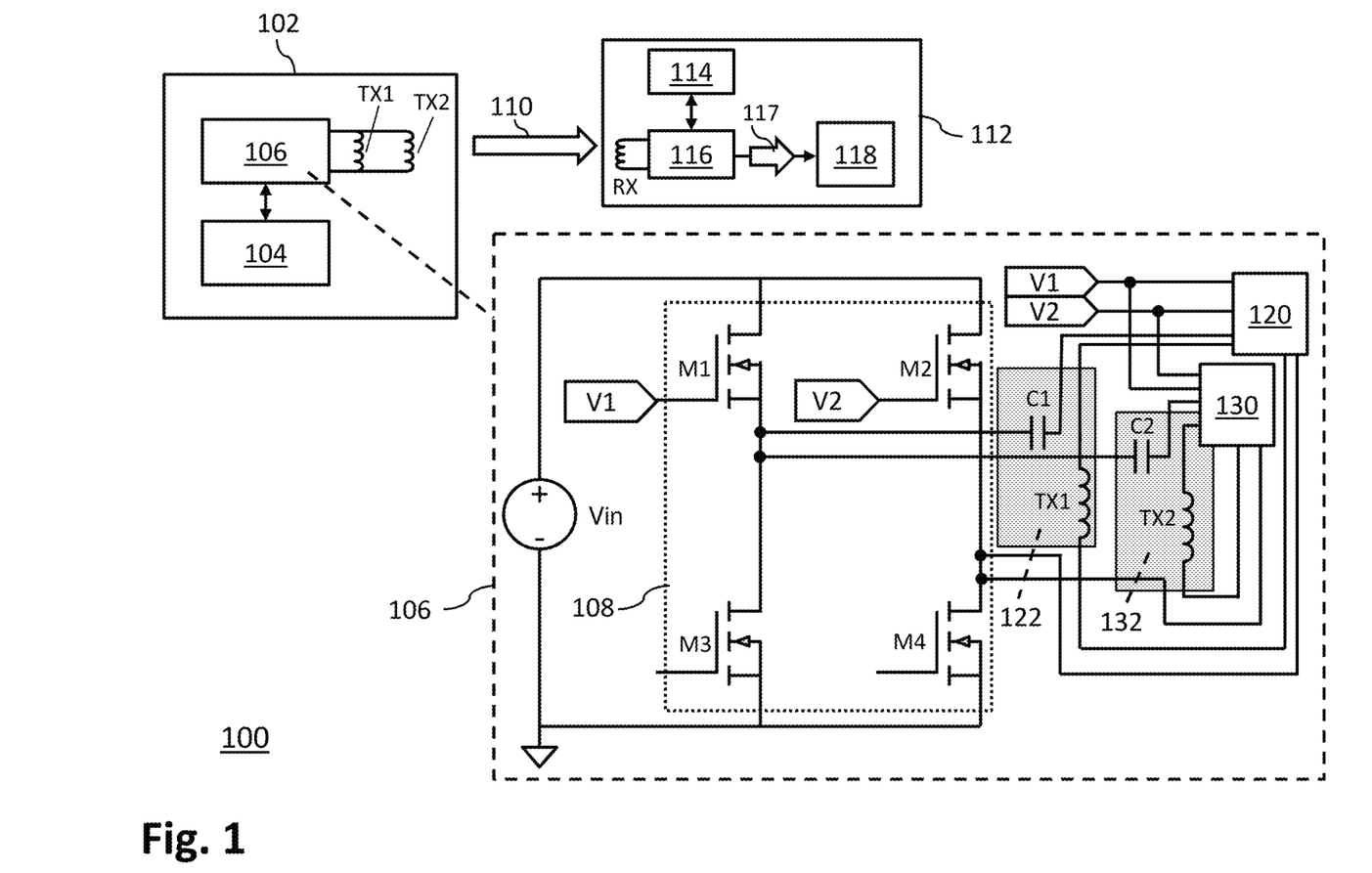
FIG. 1 is a diagram showing an example system that can implement multi-element driver topology for element selection in one embodiment.

FIG. 1 is a diagram showing an example system 100 that can implement multi-element driver topology for element selection in one embodiment. In an example, a circuit element can be a coil or a capacitor, such that a multi-element device can be a multi-coil device including multiple selectable coils or a multi-capacitor device including multiple selectable capacitors. The system 100 can be a wireless communication system that can facilitate wireless transmission of power and/or data. The system 100 can include a transmitter 102 and a receiver 112 configured to be in communication with each other. The transmitter 102 can be a wireless power transmitter connected to a DC power supply and can transmit AC power from the connected DC power supply. The transmitter 102 can be an apparatus configured as a multi-coil wireless power transmitter including more than one transmission (TX) coil, such as a coil TX1 and a coil TX2. The transmitter 102 can include a controller 104 and a transmission unit 106. The controller 104 can be configured to control and operate the transmission unit 106.

In an example, the controller 104 can be configured to control the transmission unit 106 to drive the coil TX1 or TX2 to produce a magnetic field. In an example, the transmission unit 106 can drive the coil TX1 or TX2 to produce signals of a range of frequencies and configurations defined by wireless power standards, such as the Wireless Power Consortium (Qi) standard, the Power Matters Alliance (PMA) standard, and/or the Alliance for Wireless Power (A for WP, or Rezence) standard. In an example, the controller 104 of the transmitter 102 can be configured to exchange communication signals or messages with the receiver 112.

For example, the controller 104 can be configured to detect and identify the receiver 112 prior to performing power transmission to the receiver 112. In an example, the receiver 112 can include multiple capacitors, and the receiver 112 can switch different number of capacitors to generate amplitude shift key (ASK) signals. The receiver 112 can encode messages in the ASK signals and transmit the ASK signals to the transmitter 102. The transmitter 102 can respond to the messages transmitted from the receiver 112 by generating frequency shift key (FSK) signals and encoding messages in the FSK signals.

The receiver 112 can be a wireless power receiver that can be located in, for example, a computing device, a mobile phone, a tablet device, a wearable device, and/or other electronic devices that can be configured to receive power wirelessly. The receiver 112 can include a controller 114 and a power rectifier 116. The power rectifier 116 can include a coil, labeled as RX. The magnetic field produced by the coils TX1 and/or TX2 of the transmitter 102 can induce a current in the coil RX of the power rectifier 116. The induced current can cause an amount of AC power 110 to be inductively transmitted from the transmission unit 106 to the power rectifier 116. The power rectifier 116 can receive the AC power 110 and convert the AC power 110 into direct current (DC) power 117, and provide the DC power 117 to load 118. The load 118 can be, for example, a battery charger configured to charge a battery, a DC-DC converter configured to supply a processor or a display, and/or other electronic components that requires the DC power 117 to operate.

In an example shown in FIG. 1, the transmission unit 106 can include an inverter 108. The inverter 108 can be, for example, a full H-bridge inverter. The inverter 108 can include switching elements labeled as M1, M2, M3, and M4. In an example, the switching elements M1, M2, M3, and M4 can be metal—oxide—semiconductor field-effect transistors (MOSFETs). The switching elements M1 and M2 can be high-side switching elements of the inverter 108, and the switching elements M3 and M4 can be low side switching elements of the inverter 108.

The coil TX1 can be connected to the inverter 108. A capacitor C1 can be connected to the coil TX1 to form a resonant circuit 122. The capacitor C1 can be a compensation capacitor configured to compensate or control the resonant frequency of the resonant circuit 122. A switch circuit 120 can be connected between the inverter 108 and the coil TX1. In an example, the switch circuit 120 can be controlled by the controller 104 for switching the coil TX1 on or off. For example, the controller 104 can generate a digital signal to control the switch circuit 120 for selecting (e.g., switching on) the coil TX1 for outputting the AC power 110, or for deselecting (e.g., switch off) the coil TX1. In the example shown in FIG. 1, the switch circuit 120 and the high-side switching elements M1 and M2 of the inverter 108 can be driven by the same voltages V1 and V2. In an example, the voltages V1 and V2 can be generated by a power supply of the transmitter 102, or a power supply connected to the transmitter 102. In an example, the voltages V1 and V2 can be received by the inverter 108 and the switch circuit 120 via a bootstrap capacitor of the controller 104 in the transmitter 102.

The coil TX2 can be connected to the inverter 108. A capacitor C2 can be connected to the coil TX2 to form another resonant circuit 132. The capacitor C2 can be a compensation capacitor configured to compensate or to control a resonant frequency of the resonant circuit 132. A switch circuit 130 can be connected between the inverter 108 and the coil TX2. In an example, the switch circuit 130 can be controlled by the controller 104 for switching the coil TX2 on or off. For example, the controller 104 can generate a digital signal to control the switch circuit 130 for selecting (e.g., switching on) the coil TX2 for outputting the AC power 110, or for deselecting (e.g., switch off) the coil TX2. In the example shown in FIG. 1, the switch circuit 130 and the high-side switching elements M1 and M2 of the inverter 108 can be driven by the same voltages V1 and V2. In an example, the voltages V1 and V2 can be received by the inverter 108 and the switch circuit 130 via a bootstrap capacitor of the transmitter 102.

Although two transmission coils are shown in the example of FIG. 1, it will be apparent to a person of ordinary skill in the art that a topology of the transmission unit 106 can be expanded by connecting additional transmission coils (and corresponding compensation capacitors to form resonant circuits) to the inverter 108. Each additional coil being added to the transmission unit 106 can result in an addition of a switch circuit (e.g., switch circuit 120, 130) as well. To be described in more detail below, by having the high-side switching elements M1 and M2 of the inverter 108 and the multiple switch circuits in the transmission unit 106 (e.g., switch circuits 120, 130, and any additional switch circuits) being driven by common voltages or voltage sources, a number of components being added as a result of adding switch circuits to accommodate additional transmission coils can be reduced.

Figure 2:
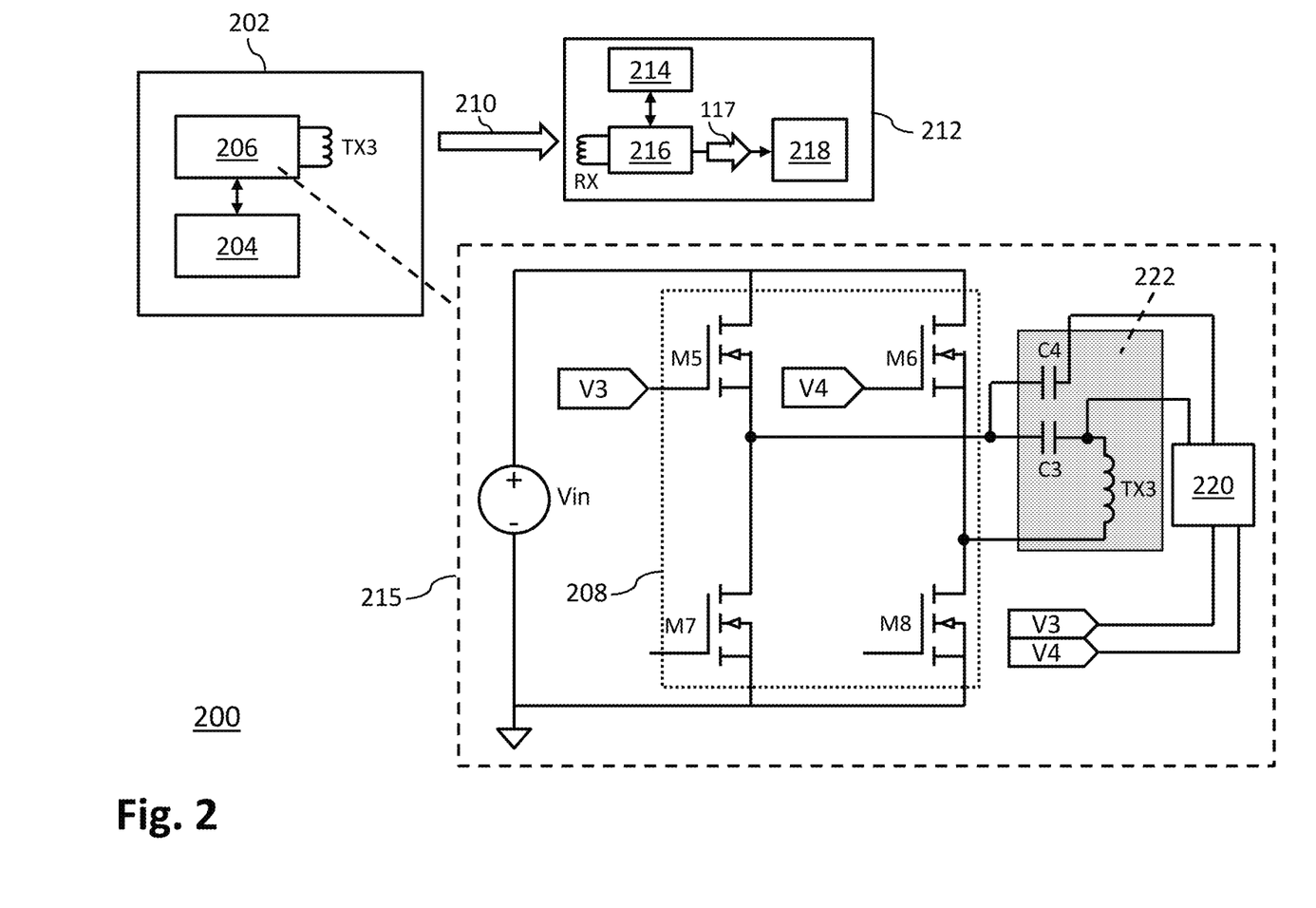
FIG. 2 is a diagram showing another example system that can implement multi-element driver topology for element selection in one embodiment.

FIG. 2 is a diagram showing another example system 200 that can implement multi-element driver topology for element selection in one embodiment. The system 200 can be a wireless communication system that can facilitate wireless transmission of power and/or data. The system 200 can include a transmitter 202 and a receiver 212 configured to be in communication with each other. The transmitter 202 can be a wireless power transmitter connected to a DC power supply and can transmit AC power from the connected DC power supply. The transmitter 202 can be an apparatus configured as a single coil wireless power transmitter including a transmission coil TX3. The transmitter 202 can include a controller 204 and a transmission unit 206. The controller 204 can be configured to control and operate the transmission unit 206.

In an example, the controller 204 can be configured to control the transmission unit 206 to drive the coil TX3 to produce a magnetic field. In an example, the transmission unit 206 can drive the coil TX3 to produce signals of a range of frequencies and configurations defined by wireless power standards, such as the Wireless Power Consortium (Qi) standard, the Power Matters Alliance (PMA) standard, and/or the Alliance for Wireless Power (A for WP, or Rezence) standard. In an example, the controller 204 of the transmitter 202 can be configured to exchange communication signals or messages with the receiver 212. For example, the controller 204 can be configured to detect and identify the receiver 212 prior to performing power transmission to the receiver 212. In an example, the receiver 212 can include multiple capacitors, and the receiver 212 can switch different number of capacitors to generate amplitude shift key (ASK) signals. The receiver 212 can encode messages in the ASK signals and transmit the ASK signals to the transmitter 202. The transmitter 202 can respond to the messages transmitted from the receiver 212 by generating frequency shift key (FSK) signals and encoding messages in the FSK signals.

The receiver 212 can be a wireless power receiver that can be located in, for example, a computing device, a mobile phone, a tablet device, a wearable device, and/or other electronic devices that can be configured to receive power wirelessly. The receiver 212 can include a controller 214 and a receiver unit 216 that may include a power rectifier. The receiver unit 216 can further include a coil, labeled as RX. The magnetic field produced by the coil TX3 of the transmitter 202 can induce a current in the coil RX of the receiver unit 216. The induced current can cause an amount of AC power 210 to be inductively transmitted from the transmission unit 206 to the receiver unit 216. The receiver unit 216 can receive the AC power 210 and convert the AC power 210 into direct current (DC) power 217, and provide the DC power 217 to load 218. The load 218 can be, for example, a battery charger configured to charge a battery, a DC-DC converter configured to supply a processor or a display, and/or other electronic components that requires the DC power 217 to operate.

In an example shown in FIG. 2, the transmission unit 206 and/or the receiver unit 216 can include a circuit 215. Although the circuit 215 in FIG. 2 is being shown as a part of the transmitter unit 206, it will be apparent to a person of ordinary skill in the art that the circuit 215 may be a part of the receiver unit 216 as well. The circuit 215 may include an inverter 208. The inverter 208 can be, for example, a full H-bridge inverter. The inverter 208 can include switching elements labeled as M5, M6, M7, and M8. In an example, the switching elements M5, M6, M7, and M8 can be metal—oxide—semiconductor field-effect transistors (MOSFETs). The switching elements M5 and M6 can be high-side switching elements of the inverter 208, and the switching elements M7 and M8 can be low side switching elements of the inverter 208.

The coil TX3 can be connected to the inverter 208. A capacitor C3 and a capacitor C4 can be connected to the coil TX3 to form a resonant circuit 222. The capacitors C3 and C4 can be compensation capacitors configured to compensate or to control a resonant frequency of the resonant circuit 222. A switch circuit 220 can be connected between the inverter 208 and the capacitor C4. In an example, the switch circuit 220 can be controlled by the controller 204 for selecting the capacitor C4, or for switching the capacitor C4 in or out of the resonant circuit 222. For example, the controller 204 can generate a digital signal to control the switch circuit 220 for switching in the capacitor C4, such that the capacitors C3 and C4 can operate simultaneously to compensate the resonant frequency of the resonant circuit 222. The controller 204 can further generate the digital signal to control the switch circuit 220 for switching out the capacitor C4, such that the capacitor C3 becomes the sole compensation capacitor to compensate the resonant frequency of the resonant circuit 222. In the example shown in FIG. 2, the switch circuit 220 and the high-side switching elements M5 and M6 of the inverter 208 can be driven by the same voltages V3 and V4. In an example, the voltages V3 and V4 can be generated by a power supply of the transmitter 202, or a power supply connected to the transmitter 202. In an example, the voltages V3 and V4 can be received by the inverter 208 and the switch circuit 220 via a bootstrap capacitor of the transmitter 202.

Although two capacitors C3 and C4 are shown in the example in FIG. 2, it will be apparent to a person of ordinary skill in the art that the circuit 215 may include more than 2 capacitors. In an example, the multi-coil topology shown in FIG. 1 may be combined with the multi-capacitor topology shown in FIG. 2. For example, the transmitter unit 106 in FIG. 1, the transmitter unit 206 in FIG. 2, the receiver unit 116 in FIG. 2, and/or the receiver unit 206 in FIG. 2, may include multiple capacitors and multiple coils. A number of coils may define a charging area of the system 100 or the system 200, and a number of capacitors may define a resonant capacitance of the system 100 or the system 200. Thus, the number of coils and/or the number of capacitors may be dependent on a desired design and/or implementation of the systems 100, 200 (e.g., optimization of charging area and/or resonant capacitance). To be described in more detail below, by having the high-side switching elements M5 and M6 of the inverter 208, and the switch circuit 220, being driven by common voltages or voltage sources, a number of components being added as a result of adding switch circuits to accommodate additional transmission coils can be reduced.

Figure 3:
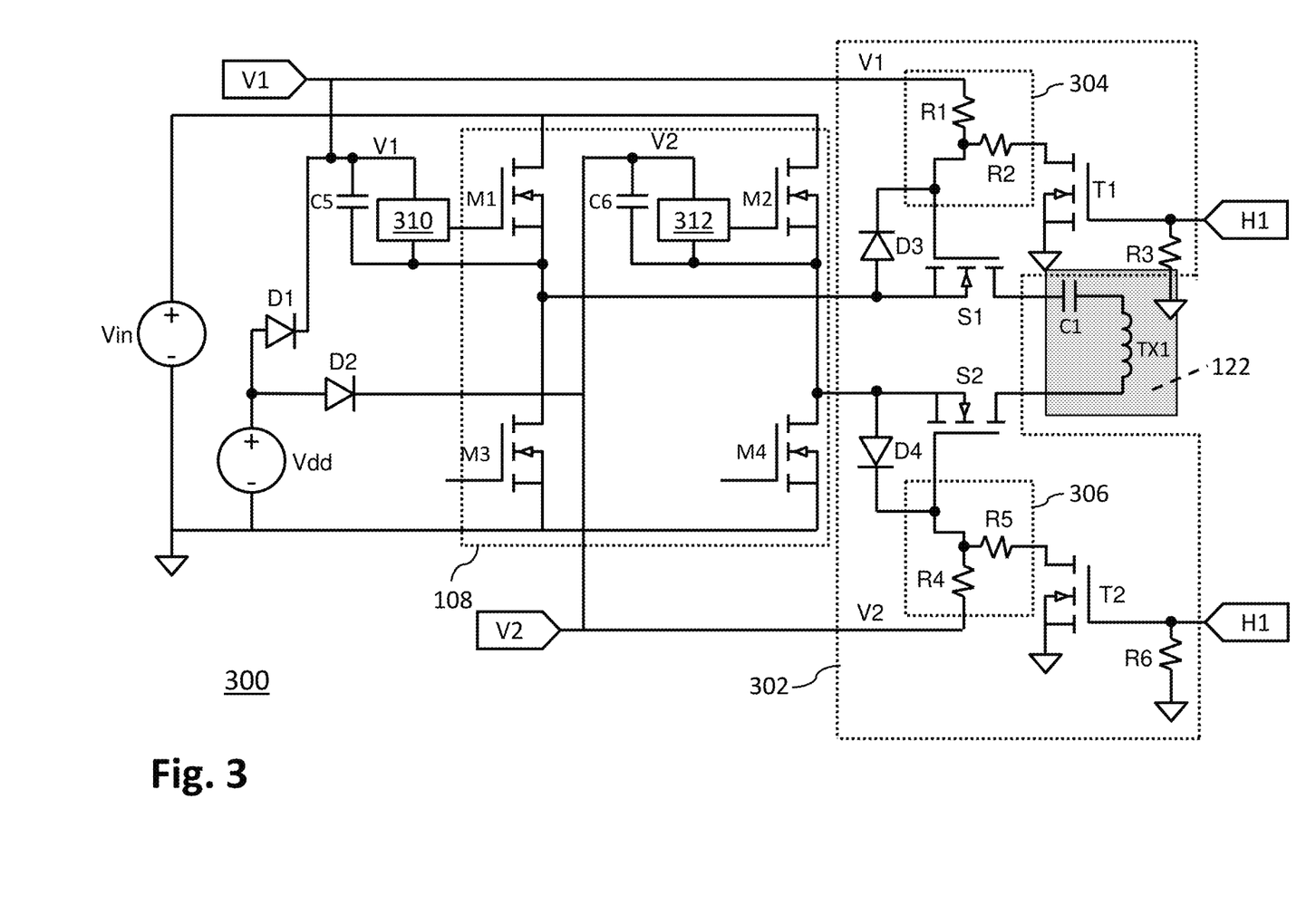
FIG. 3 is a diagram showing an example switch circuit that can implement multi-element driver topology for element selection in one embodiment.

FIG. 3 is a diagram showing an example switch circuit 302 that can implement multi-element driver topology for element selection in one embodiment. In an example shown in FIG. 3, the transmission unit 106 of FIG. 1 can include a circuit 300 shown in FIG. 3. The circuit 300 can include the inverter 108, the resonant circuit 122, and the switch circuit 302. In an example, the resonant circuit 132 (see FIG. 1) can be added to the circuit 300, and another copy of the switch circuit 302 can be connected to the added resonant circuit 132 and the inverter 108. In an example, the switching element M1 can be driven by the voltage V1, where the voltage V1 can be generated from a power supply and received from a controller (e.g., controller 104 in FIG. 1). A driver 310 can be connected to the switching element M1, where the driver 310 can be configured to receive the voltage V1 and apply the voltage V1 to a gate terminal of the switching element M1. The switching element M2 can be driven by the voltage V2, where the voltage V2 can be generated from power supply and received from a controller (e.g., controller 104 in FIG. 1). A driver 312 can be connected to the switching element M2, where the driver 312 can be configured to receive the voltage V2 and apply the voltage V2 to a gate terminal of the switching element M2.

The switch circuit 120 shown in FIG. 1 can be configured as the switch circuit 302 shown in FIG. 3. The switch circuit 302 can include a switch S1 and a switch S2. In an example, the switches S1 and S2 can be MOSFETs. The resonant circuit 122, including the capacitor C1 and the transmission coil TX1, can be connected to the switches S1 and S2. In an example, the transmission coil TX1 is selected for outputting power for the transmitter 102 in response to the switches S1 and S2 being switched on. Further, the transmission coil TX1 is not being selected for outputting power for the transmitter 102 in response to the switches S1 and S2 being switched off.

The switch S1 can be driven by the voltage V1 via a resistor R1 connected to a gate terminal of the switch S1. The switch S1 can be switched on in response to the voltage V1 being at a level sufficient (e.g., greater than a threshold voltage of the switch S1) to allow current to flow from the inverter 108 to the resonant circuit 122. The switch S1 can be switched off in response to the voltage V1 being at an insufficient level (e.g., less than the threshold voltage of the switch S1) to prevent current from flowing from the inverter 108 to resonant circuit 122.

The switch S2 can be driven by the voltage V2 via a resistor R4 connected to a gate terminal of the switch S2. The switch S2 can be switched on in response to the voltage V2 being at a level sufficient (e.g., greater than a threshold voltage of the switch S2) to allow current to flow from the inverter 108 to the resonant circuit 122. The switch S2 can be switched off in response to the voltage V2 being at an insufficient level (e.g., less than the threshold voltage of the switch S2) to prevent current from flowing from the inverter 108 to the resonant circuit 122.

The switch circuit 302 can include a voltage divider 304 formed by the resistor R1 and a resistor R2, and another voltage divider 306 formed by the resistor R4 and a resistor R5. The voltage divider 304 can be configured to output a fraction of the voltage V1 to the gate terminal of the switch S1 in response to a switch T1 being switched on. The voltage divider 306 can be configured to output a fraction of the voltage V2 to the gate terminal of the switch S2 in response to a switch T2 being switched on. A signal H1 can be a signal generated by the controller 104 (see FIG. 1) for switching on or off the switches T1 and T2. In an example, a default value or voltage of the signal H1 can be at a level insufficient to switch on the switches T1 and T2 (e.g., less than the threshold voltage of the switches T1 and T2), such that the switches T1 and T2 remain in an off state by default. In response to the switch T1 and T2 being switched off, the voltages V1 and V2 can be applied to the gate terminals of the switches S1 and S2, respectively, since current will not be directed to the resistors R2 and R5 when the switches T1 and T2 are switched off. Note that in an example, the signal H1 can indicate whether the transmission coil TX1 is selected for outputting power for the transmitter 102. For example, the signal H1 being at a logic high state (e.g., representing a voltage sufficient to switch on the switches T1 and T2) can indicate that the coil TX1 is not being selected, and the signal H1 being at a logic low state (e.g., representing a voltage insufficient to switch on the switches T1 and T2) can indicate that the coil TX1 is being selected.

To switch off the switches S1 and S2, the controller 104 can generate the signal H1 to the logic high state such that a voltage represented by the signal H1 is sufficient to switch on the switches T1 and T2. In response to the switches T1 and T2 being switched on, current generated by the voltages V1 and V2 can be directed to towards the resistors R2 and R5, respectively, thus outputting fractions of the voltages V1 and V2 to the gate terminals of the switches S1 and S2. Thus, the switches S1 and S2 can be switched on or off based on the signal H1.

An amount of the voltages V1 and V2 being reduced can be based on the resistance values of the resistors R1, R2 and the resistors R4, R5, respectively. For example, the resistance values of the resistors R1 and R2, and R4 and R5, may be chosen such that the reduced amount of voltages V1 and V2 can fall below the threshold level of the switch S1 and S2, respectively. The voltages V1 and V2 being applied to the high-side switching elements M1 and M2 may not be affected by the voltage dividers 304 and 306. Thus the high-side switching elements M1 and M2 can maintain normal operation despite sharing voltage sources with the switches S1 and S2.

To expand the circuit 300 for multi-coil applications, additional coils such as the transmission coil TX2 can be added to the circuit 300. The controller 104 can be configured to generate different digital signals for different switch circuits to control selection of one or more transmission coils. For example, referring to FIG. 1, the controller 104 can generate the signal H1 to select or deselect the coil TX1, and can generate another digital signal to select or deselect the coil TX2. The addition of the coil TX2 may require an addition of another copy of the switch circuit 302 to the circuit 300 in order for the transmission coil TX2 to be selected. In an example, each copy of switch circuit 302 being added can result in an addition of, for example, ten circuit components, such as R1, R2, T1, D3, R3 connected to the switch S1, and R4, R5, T2, D4, R6 connected to the switch S2. The circuit components being added to the circuit 300 for each additional coil can be a relatively small number of circuit components when compared to other traditional multi-core transmitters. The reduced number of circuit components being added for each additional coil can be a result from allowing the selection switches (e.g., switches S1 and S2) to share common voltage sources with the high-side switching elements of the inverter 108.

Figure 4:
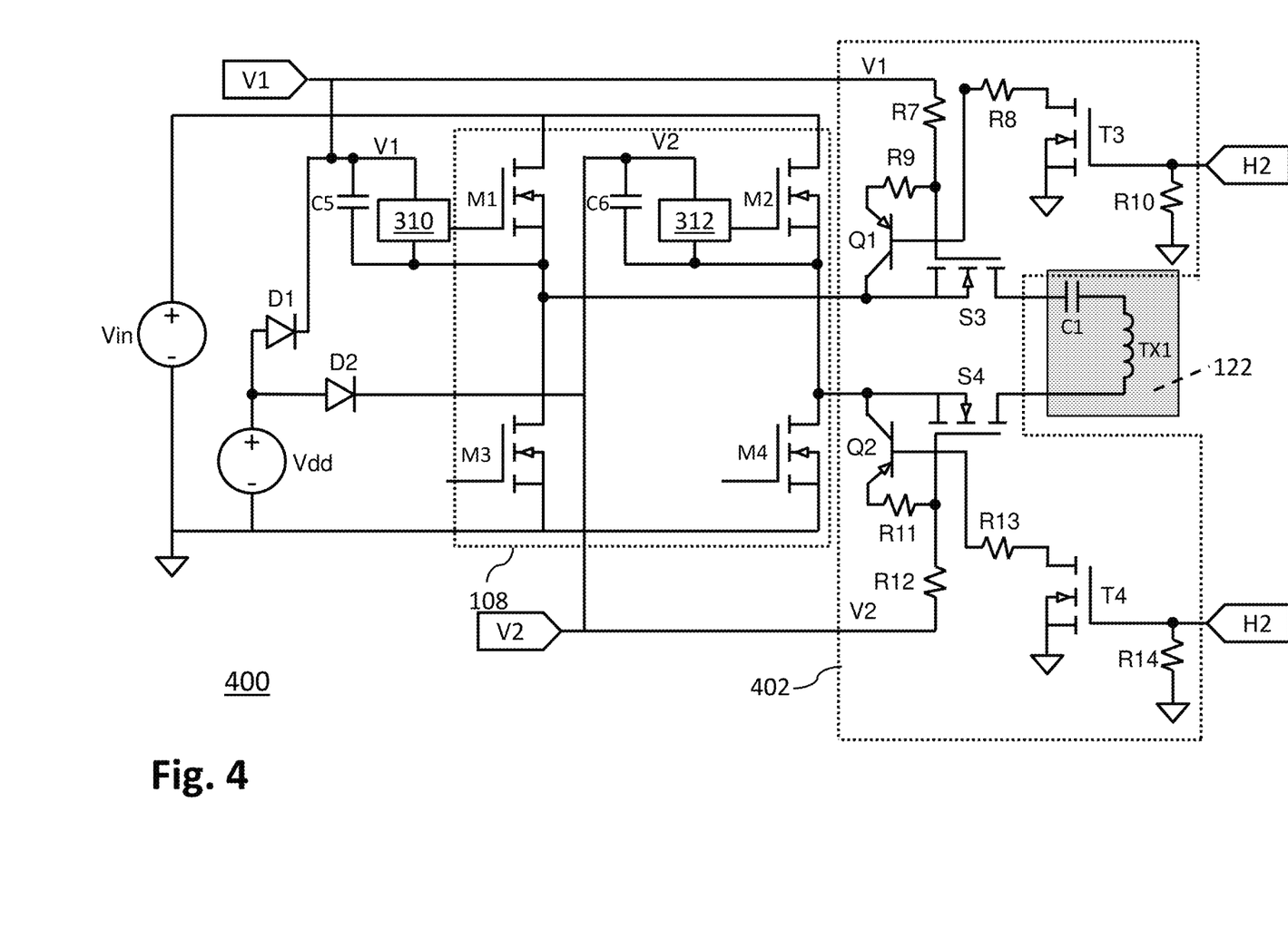
FIG. 4 is a diagram showing another example switch circuit that can implement multi-element driver topology for element selection in one embodiment.

FIG. 4 is a diagram showing another example switch circuit 402 that can implement multi-element driver topology for component selection in one embodiment. In an example shown in FIG. 4, the transmission unit 106 of FIG. 1 can include a circuit 400 shown in FIG. 4. The circuit 400 can include the inverter 108, the resonant circuit 122, and the switch circuit 402. In an example, the resonant circuit 132 (see FIG. 1) can be added to the circuit 400, and another copy of the switch circuit 402 can be connected to the added resonant circuit 132 and the inverter 108. In an example, the switching element M1 can be driven by the voltage V1, where the voltage V1 can be generated from a power supply and received from a controller (e.g., controller 104 in FIG. 1). The switching element M2 can be driven by the voltage V2, where the voltage V2 can be generated from the power supply and received from a controller (e.g., controller 104 in FIG. 1).

The switch circuit 120 shown in FIG. 1 can be configured as the switch circuit 402 shown in FIG. 4. The switch circuit 402 can include a switch S3 and a switch S4. In an example, the switches S3 and S4 can be MOSFETs. The resonant circuit 122, including the capacitor C1 and the transmission coil TX1, can be connected to the switches S3 and S4. In an example, the transmission coil TX1 is selected for outputting power for the transmitter 102 in response to the switches S3 and S4 being switched on. Further, the transmission coil TX1 is not being selected for outputting power for the transmitter 102 in response to the switches S3 and S4 being switched off.

The switch S3 can be driven by the voltage V1 via a resistor R7 connected to a gate terminal of the switch S3. The switch S3 can be switched on in response to the voltage V1 being at a level sufficient (e.g., greater than a threshold voltage of the switch S3) to allow current to flow from the inverter 108 to the resonant circuit 122. The switch S3 can be switched off in response to the voltage V1 being at an insufficient level (e.g., less than the threshold voltage of the switch S3) to prevent current from flowing from the inverter 108 to resonant circuit 122.

The switch S4 can be driven by the voltage V2 via a resistor R12 connected to a gate terminal of the switch S4. The switch S4 can be switched on in response to the voltage V2 being at a level sufficient (e.g., greater than a threshold voltage of the switch S4) to allow current to flow from the inverter 108 to the resonant circuit 122. The switch S4 can be switched off in response to the voltage V2 being at an insufficient level (e.g., less than the threshold voltage of the switch S4) to prevent current from flowing from the inverter 108 to the resonant circuit 122.

The switch circuit 302 can include a transistor Q1 and a transistor Q2. The transistors Q1 and Q2 can be, for example, PNP transistors constructed by sandwiching an N-type semiconductor between two P-type semiconductors. The transistors Q1 and Q2 can be switched on or off based on a switch T3 and a switch T4, respectively. A signal H2 can be a digital signal generated by the controller 104 (see FIG. 1) for switching on or off the switches T3 and T4. In an example, a default value or voltage of the signal H2 can be at a level sufficient to switch on the switches T3 and T4 (e.g., greater than the threshold voltage of the switches T3 and T4), such that the switches T3 and T4 remain in an on state by default. In response to the switch T3 and T4 being switched on, the transistors Q1 and Q2 can be switched off and the voltages V1 and V2 can be applied to the gate terminals of the switches S3 and S4 respectively, since current will not be flowing through the switched off transistors Q1 and Q2. Note that in an example, the signal H2 can indicate whether the transmission coil TX1 is selected for outputting power for the transmitter 102. For example, the signal H2 being at a logic low state (e.g., representing a voltage insufficient to switch on the switches T3 and T4) can indicate that the coil TX1 is not being selected, and the signal H2 being at a logic high state (e.g., representing a voltage sufficient to switch on the switches T3 and T4) can indicate that the coil TX1 is being selected.

To switch off the switches S3 and S4, the controller 104 can generate the signal H2 to the logic low state such that a voltage represented by the signal H2 is insufficient to switch on the switches T3 and T4. In response to the switches T3 and T4 being switched off, current generated by the voltages V1 and V2 can be directed to towards the transistors Q1 and Q2, respectively. By switching on the transistors Q1 and Q2, the voltage being applied to the gate terminals of the switches S3 and S4 can be reduced, such as being reduced to a level lower than the threshold voltage of the switches S3 and S4. Thus, the switches S3 and S4 can be switched on or off based on the signal H2. The voltages V1 and V2 being applied to the high-side switching elements M1 and M2 may not be affected by the voltage reduction caused by the transistors Q1 and Q2. Thus the high-side switching elements M1 and M2 can maintain normal operation despite sharing voltage sources with the switches S3 and S4.

To expand the circuit 400 for multi-coil applications, additional coils such as the transmission coil TX2 (see FIG. 1) can be added to the circuit 400. The controller 104 can be configured to generate different digital signals for different switch circuits to control selection of one or more transmission coils. For example, referring to FIG. 1, the controller 104 can generate the signal H2 to select or deselect the coil TX1, and can generate another digital signal to select or deselect the coil TX2. The addition of the coil TX2 may require an addition of another copy of the switch circuit 402 to the circuit 400 in order for the transmission coil TX2 to be selectable by the controller 104. In an example, each copy of switch circuit 402 being added can result in an addition of, for example, twelve circuit components, such as R7, R8, R9, R10, Q1, and T3 connected to the switch S3, and R11, R12, R13, R14, Q2, and T4 connected to the switch S4. The circuit components being added to the circuit 400 for each additional coil can be a relatively small number of circuit components when compared to other traditional multi-core transmitters. The reduced number of circuit components being added for each additional coil can be a result from allowing the selection switches (e.g., switches S3 and S4) to share common voltage sources with the high-side switching elements of the inverter 108.

Figure 5:
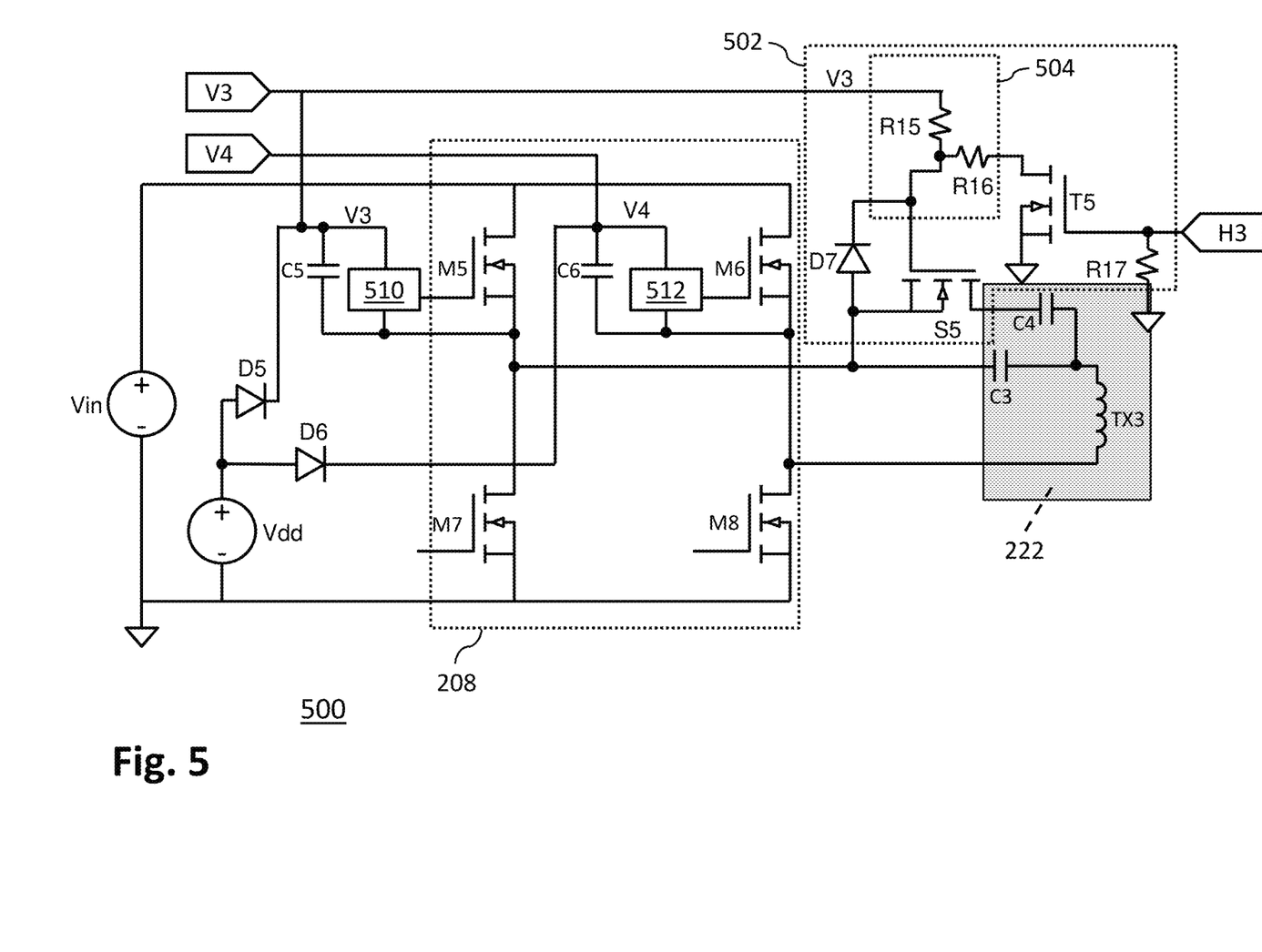
FIG. 5 is a diagram showing another example switch circuit that can implement multi-element driver topology for element selection in one embodiment.

FIG. 5 is a diagram showing another example switch circuit 502 that can implement multi-element driver topology for component selection in one embodiment. In an example shown in FIG. 5, the transmission unit 206 of FIG. 2 can include a circuit 500 shown in FIG. 5. The circuit 500 can include the inverter 208, the resonant circuit 222, and the switch circuit 502. In an example, the switching element M5 can be driven by the voltage V3, where the voltage V3 can be generated from a power supply and received from a controller (e.g., controller 204 or 214 in FIG. 2). A driver 510 can be connected to the switching element M5, where the driver 510 can be configured to receive the voltage V3 and apply the voltage V3 to a gate terminal of the switching element M5. The switching element M6 can be driven by the voltage V4, where the voltage V4 can be generated from the power supply and received from a controller (e.g., controller 204 or 214 in FIG. 2). A driver 512 can be connected to the switching element M6, where the driver 512 can be configured to receive the voltage V4 and apply the voltage V4 to a gate terminal of the switching element M6.

The switch circuit 120 shown in FIG. 1 can be configured as the switch circuit 502 shown in FIG. 5. The switch circuit 502 can include a switch S5. In an example, the switch S5 can be a MOSFET. The resonant circuit 222, including the capacitors C3 and C4, and the transmission coil TX3, can be connected to switch circuit 502. The capacitor C4 can be connected to the switch S5, such that the switch S5 can switch the capacitor C4 in or out of the resonant circuit 222. The switch S5 can be driven by the voltage V3 via a resistor R15 connected to a gate terminal of the switch S5. The switch S5 can be switched on in response to the voltage V3 being at a level sufficient (e.g., greater than a threshold voltage of the switch S5) to allow current to flow from the inverter 108 to the capacitor C4. The switch S5 can be switched off in response to the voltage V3 being at an insufficient level (e.g., less than the threshold voltage of the switch S5) to prevent current from flowing from the inverter 108 to the capacitor C4, thus switching the capacitor C4 out of the resonant circuit 222.

The switch circuit 502 can include a voltage divider 504 formed by the resistor R15 and a resistor R16. The voltage divider 504 can be configured to output a fraction of the voltage V3 to the gate terminal of the switch S5 in response to a switch T5 being switched on. A signal H3 can be a digital signal generated by the controller 104 (see FIG. 1) for switching on or off the switch T5. In an example, a default value or voltage of the signal H3 can be at a level insufficient to switch on the switch T5 (e.g., less than the threshold voltage of the switches T1 and T2), such that the switch T5 can remain in an off state by default. In response to the switch T5 being switched off, the voltage V3 can be applied to the gate terminal of the switch S5 since the current will not flow to the resistor R16 when the switch T5 is switched off. In an example, the signal H3 can indicate whether the capacitor C4 is selected for compensating a resonant frequency of the resonant circuit 222. For example, the signal H3 being at a logic high state (e.g., representing a voltage sufficient to switch on the switch T5) can indicate that the capacitor C4 is not being selected and the capacitor C3 can be the sole compensation capacitor for the resonant circuit 222. The signal H3 being at a logic low state (e.g., representing a voltage insufficient to switch on the switch T5) can indicate that the capacitor C4 is being selected, and both the capacitors C3 and C4 can perform frequency compensation for the resonant circuit 222.

To switch off the switch S5, the controller 104 can generate the signal H3 to the logic high state such that a voltage represented by the signal H3 is sufficient to switch on the switch T5. In response to the switch T5 being switched on, current generated by the voltages V3 can be directed to towards the resistors R16, thus outputting fractions of the voltage V3 to the gate terminal of the switch S5. Thus, the switch S5 can be switched on or off based on the signal H3. An amount of the voltage V3 being reduced can be based on the resistance values of the resistors R15 and R16. For example, the resistance values of the resistors R15 and R16 may be chosen such that the reduced amount of voltage V3 can fall below the threshold level of the switch S5. The voltage V3 being applied to the high-side switching elements M5 may not be affected by the voltage divider 504. Thus the high-side switching element M3 can maintain normal operation despite sharing a voltage source with the switch S5.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. An apparatus comprising:
 a circuit connected to a circuit element, the circuit comprising:
  a selection switch connected between an inverter and the circuit element;
  a switch connected between the inverter and ground, the switch being configured to receive a selection signal indicating whether the circuit element is being selected or deselected;
 wherein:
  in response to the selection signal indicating the circuit element is being deselected, the switch is maintained in an off state to cause a voltage to be applied to a gate of the selection switch, wherein the voltage being applied to the gate of the selection switch drives the selection switch to an on state to connect the circuit element to the inverter, and the voltage is same as a voltage being used for driving a high-side switching element of the inverter; and
  in response to the selection signal indicating the circuit element is being selected, the switch is driven to an on state to cause a fraction of the voltage to be applied to the gate of the selection switch, wherein the fraction of the voltage being applied to the gate of the selection switch drives the selection switch to an off state to disconnect the circuit element from the inverter.

2. The apparatus of claim 1, wherein:
 the high-side switching element is a first high-side switching element;
 the inverter further comprises a second high-side switching element;
 the circuit element is a coil;
 the switch is a first switch;
 the selection switch is a first selection switch;
 the voltage is a first voltage; and
 the circuit is connected to a second circuit element, wherein the circuit comprises a second switch connected between the inverter and ground, and the circuit is further configured to:
  in response to the selection signal indicating the circuit element is being deselected, maintain the second switch in an off state to cause a second voltage to be applied to a gate of a second selection switch connected between the inverter and the second circuit element, wherein the second voltage being applied to the gate of the second selection switch drives the second selection switch to an on state to connect the second circuit element to the inverter, and the second voltage is same as a voltage being used for driving the second high-side switching element of the inverter; and
  in response to the selection signal indicating the circuit element is being selected, drive the second switch to an on state to cause a fraction of the second voltage to be applied to the gate of the second selection switch, wherein the fraction of the second voltage being applied to the gate of the second selection switch drives the second selection switch to an off state to disconnect the second circuit element from the inverter.

3. The apparatus of claim 2, wherein:
 the coil is a first coil;
 the circuit is a first circuit;
 the apparatus further comprises a second circuit configured to select a second circuit element, the second circuit element being a second coil, the second circuit comprising:
  a third selection switch connected between the inverter and the second circuit element, wherein the first voltage is applied to a gate of the third selection switch in response to the selection signal indicating the second circuit element is selected; and
  a fourth selection switch connected between the inverter and the second circuit element, wherein the second voltage is applied to a gate of the fourth selection switch in response to the selection signal indicating the second circuit element is selected.

4. The apparatus of claim 1, wherein the circuit element is a capacitor connected between the inverter and a coil.

5. The apparatus of claim 4, wherein:
 the capacitor is a first capacitor;
 a second capacitor is connected between the inverter and the coil, the second capacitor and the coil form a resonant circuit; and
 in response to the circuit selecting the first capacitor, the first capacitor is switched into the resonant circuit.

6. The apparatus of claim 1, wherein the circuit comprises a voltage divider, and the circuit is configured to:
 in response to the selection signal indicating the circuit element is being deselected, activate the voltage divider to deselect the circuit element.

7. The apparatus of claim 1, wherein the circuit comprises a PNP transistor, and the circuit is configured to:
 in response to the selection signal indicating the circuit element is being deselected, activate the PNP transistor to deselect the circuit element.

8. The apparatus of claim 1, wherein the circuit is a part of a wireless power transmitter.

9. An apparatus comprising:
 an inverter including a high-side switching element;

a circuit element; and a circuit comprising a switch connected between the inverter and ground, and a selection switch connected between the inverter and the circuit element, the circuit being configured to:
receive a selection signal indicating whether the circuit element is being selected or deselected;
in response to the selection signal indicating the circuit element is being deselected, maintain the switch in an off state to cause a voltage to be applied to a gate of the selection switch, wherein the voltage being applied to the gate of the selection switch drives the selection switch to an on state to connect the circuit element to the inverter, and the voltage is same as a voltage being used for driving the high-side switching element of the inverter; and
in response to the selection signal indicating the circuit element is being selected, drive the switch to an on state to cause a fraction of the voltage to be applied to the gate of the selection switch, wherein the fraction of the voltage being applied to the gate of the selection switch drives the selection switch to an off state to disconnect the circuit element from the inverter.

10. The apparatus of claim 9, wherein:
the high-side switching element is a first high-side switching element;
the inverter comprises a second high-side switching element;
the circuit element is a coil;
the switch is a first switch;
the selection switch is a first selection switch;
the voltage is a first voltage; and
the circuit is connected to a second circuit element, wherein the circuit comprises a second switch connected between the inverter and ground, and the circuit is further configured to:
in response to the selection signal indicating the circuit element is being deselected, maintain the second switch in an off state to cause a second voltage to be applied to a gate of a second selection switch connected between the inverter and the second circuit element, wherein the second voltage being applied to the gate of the second selection switch drives the second selection switch to an on state to connect the second circuit element to the inverter, and the second voltage is same as a voltage being used for driving the second high-side switching element of the inverter; and
in response to the selection signal indicating the circuit element is being selected, drive the second switch to an on state to cause a fraction of the second voltage to be applied to the gate of the second selection switch, wherein the fraction of the second voltage being applied to the gate of the second selection switch drives the second selection switch to an off state to disconnect the second circuit element from the inverter.

11. The apparatus of claim 10, wherein:
the coil is a first coil;
the circuit is a first circuit;
the apparatus further comprising a second circuit configured to select a second circuit element, the second circuit element being a second coil, the second circuit comprising:
a third selection switch connected between the inverter and the second circuit element, wherein the first voltage is applied to a gate of the third selection switch in response to the selection signal indicating the second circuit element is selected; and
a fourth selection switch connected between the inverter and the second circuit element, wherein the second voltage is applied to a gate of the fourth selection switch in response to the selection signal indicating the second circuit element is selected.

12. The apparatus of claim 9, wherein the circuit element is a capacitor connected between the inverter and a coil.

13. The apparatus of claim 12, wherein:
the capacitor is a first capacitor;
a second capacitor is connected between the inverter and the coil, the second capacitor and the coil form a resonant circuit; and
in response to the circuit selecting the first capacitor, the first capacitor is switched into the resonant circuit.

14. The apparatus of claim 9, wherein the inverter, the circuit element, and the circuit are parts of a wireless power transmitter.

15. An apparatus comprising:
a power supply configured to output a voltage;
a controller connected to the power supply;
a transmission unit connected to the controller, the transmission unit being configured to output power, and the transmission unit comprising:
an inverter connected to the power supply, the inverter comprising a high-side switching element;
a circuit element; and
a circuit connected to the power supply, the circuit comprising a switch connected between the inverter and ground, and a selection switch connected between the inverter and the circuit element, and the circuit is configured to:
receive a selection signal indicating whether the circuit element is being selected or deselected;
in response to the selection signal indicating the circuit element is being deselected, maintain the switch in an off state to cause the voltage to be applied to a gate of the selection switch, wherein the voltage being applied to the gate of the selection switch drives the selection switch to an on state to connect the circuit element to the inverter, and the voltage is same as a voltage being used for driving the high-side switching element of the inverter;
in response to the selection signal indicating the circuit element is being selected, drive the switch to an on state to cause a fraction of the voltage to be applied to the gate of the selection switch, wherein the fraction of the voltage being applied to the gate of the selection switch drives the selection switch to an off state to disconnect the circuit element from the inverter; and
the controller being configured to generate the selection signal to control the power being outputted by the transmission unit.

16. The apparatus of claim 15, wherein:
the high-side switching element is a first high-side switching element;
the inverter further comprises a second high-side switching element;
the circuit element is a coil;
the switch is a first switch;
the selection switch is a first selection switch;
the voltage is a first voltage; and the circuit is connected to a second circuit element, wherein the circuit comprises a second switch connected between the inverter and ground, and, the circuit is further configured to:
- in response to the selection signal indicating the circuit element is being deselected, maintain the second switch in an off state to cause a second voltage to be applied to a gate of a second selection switch connected between the inverter and the second circuit element, wherein the second voltage being applied to the gate of the second selection switch drives the second selection switch to an on state to connect the second circuit element to the inverter, and the second voltage is same as a voltage being used for driving the second high-side switching element of the inverter; and
- in response to the selection signal indicating the circuit element is being selected, drive the second switch to an on state to cause a fraction of the second voltage to be applied to the gate of the second selection switch, wherein the fraction of the second voltage being applied to the gate of the second selection switch drives the second selection switch to an off state to disconnect the second circuit element from the inverter.

17. The apparatus of claim 16, wherein:
the coil is a first coil;
the circuit is a first circuit;
the apparatus further comprises a second circuit configured to select a second circuit element, the second circuit element being a second coil, the second circuit comprising:
- a third selection switch connected between the inverter and the second circuit element, wherein the first voltage is applied to a gate of the third selection switch in response to the selection signal indicating the second circuit element is selected; and
- a fourth selection switch connected between the inverter and the second circuit element, wherein the second voltage is applied to a gate of the fourth selection switch in response to the selection signal indicating the second circuit element is selected.

18. The apparatus of claim 15, wherein the circuit element is a capacitor connected between the inverter and a coil of the transmission unit.

19. The apparatus of claim 18, wherein:
the capacitor is a first capacitor;
a second capacitor is connected between the inverter and the coil, the second capacitor and the coil form a resonant circuit; and
in response to the circuit selecting the first capacitor, the first capacitor is switched into the resonant circuit.

20. The apparatus of claim 15, wherein the power supply, the controller, and the transmission unit are parts of a wireless power transmitter.

* * * * *